United States Patent
Risinger et al.

(10) Patent No.: US 9,965,382 B2
(45) Date of Patent: May 8, 2018

(54) DATA COMPOSITE FOR EFFICIENT MEMORY TRANSFER IN A BEHAVIORAL RECOGNITION SYSTEM

(71) Applicant: Omni AI, Inc., Dallas, TX (US)

(72) Inventors: Lon W. Risinger, Katy, TX (US); Kishor Adinath Saitwal, Pearland, TX (US)

(73) Assignee: Omni AI, Inc., Houston, TX (US)

( * ) Notice: Subject to any disclaimer, the term of this patent is extended or adjusted under 35 U.S.C. 154(b) by 0 days. days.

(21) Appl. No.: 15/090,366

(22) Filed: Apr. 4, 2016

(65) Prior Publication Data
US 2017/0286284 A1 Oct. 5, 2017

(51) Int. Cl.
| | |
|---|---|
| G06F 12/00 | (2006.01) |
| G06F 12/02 | (2006.01) |
| G06F 3/06 | (2006.01) |
| G06T 1/20 | (2006.01) |
| G06K 9/66 | (2006.01) |

(52) U.S. Cl.
CPC ............ G06F 12/023 (2013.01); G06F 3/061 (2013.01); G06F 3/067 (2013.01); G06F 3/0631 (2013.01); G06F 3/0644 (2013.01); G06K 9/66 (2013.01); G06T 1/20 (2013.01); *G06F 2212/1016* (2013.01); *G06F 2212/154* (2013.01); *G06F 2212/263* (2013.01)

(58) Field of Classification Search
CPC ...... G06F 12/023; G06F 3/061; G06F 3/0631; G06F 3/0644; G06F 3/067; G06F 2212/154; G06F 2212/1016; G06F 2212/263; G06K 9/66; G06T 1/20

USPC .................................................. 711/103, 115
See application file for complete search history.

(56) References Cited

U.S. PATENT DOCUMENTS

| | | | | |
|---|---|---|---|---|
| 5,535,369 A | * | 7/1996 | Wells | G06F 3/0601 711/103 |
| 6,442,661 B1 | * | 8/2002 | Dreszer | G06F 12/023 707/999.202 |
| 2002/0016883 A1 | * | 2/2002 | Musoll | G06F 12/023 711/100 |
| 2004/0128463 A1 | * | 7/2004 | Kim | G06F 12/023 711/170 |
| 2007/0156997 A1 | * | 7/2007 | Boule | G06F 12/023 711/170 |
| 2008/0288718 A1 | * | 11/2008 | Hepkin | G06F 12/023 711/104 |
| 2011/0202743 A1 | * | 8/2011 | Kaneda | G06F 12/0284 711/170 |

(Continued)

*Primary Examiner* — Daniel C Chappell
*Assistant Examiner* — Tasnima Matin
(74) *Attorney, Agent, or Firm* — Nathan W. Poulsen; Nisha Somnath

(57) ABSTRACT

Techniques are disclosed for dynamic memory allocation in a behavioral recognition system. According to one embodiment of the disclosure, one or more variable-sized chunks of memory is allocated from a device memory for a memory pool. An application allocates at least one of the chunks of memory from the memory pool for processing a plurality of input data streams in real-time. A request to allocate memory from the memory pool for input data is received. Upon determining that one of the chunks is available in the memory pool to store the input data, the chunk is allocated from the memory pool in response to the request.

20 Claims, 8 Drawing Sheets

(56) References Cited

U.S. PATENT DOCUMENTS

| | | | |
|---|---|---|---|
| 2012/0047316 A1* | 2/2012 | Post | G06F 3/0608 711/103 |
| 2013/0241730 A1* | 9/2013 | Saitwal | H04N 7/002 340/540 |
| 2015/0046155 A1* | 2/2015 | Seow | G06F 17/2785 704/10 |
| 2017/0061012 A1* | 3/2017 | Bortnikov | G06F 17/30867 |

* cited by examiner

DATA COMPOSITE FOR EFFICIENT MEMORY TRANSFER IN A BEHAVIORAL RECOGNITION SYSTEM

BACKGROUND

Field

Embodiments of the present disclosure generally relate to techniques for analyzing digital images. More specifically, embodiments presented herein provide a framework for processing large amounts of data at a relatively high rate.

Description of the Related Art

Computer systems, in addition to standard processing resources of a central processing unit (CPU), may use computing resources provided by a graphics processing unit (GPU) to process large amounts of data in real-time. That is, although systems typically use GPUs to render graphics for display, some GPUs allow an application to use the parallel computing capabilities provided by the CPU to improve performance of the application.

For example, a behavioral recognition system configured to analyze video streams may receive and process data from a number of input sources in real-time. Such data may include video data at different resolutions, and therefore various sizes. Further, the behavioral recognition system may process the video data in different phases (e.g., foreground and background differentiation, object detection, object tracking etc.), and such processing requires considerable resources. To improve performance, the behavioral recognition system may use the parallel processing capabilities provided by the GPU. For example, the behavioral recognition system may allocate memory in the GPU so that the CPU may transfer video data to the GPU. Doing so allows the behavioral recognition system to push processing tasks to the GPU while the CPU concurrently performs its own processing tasks.

However, using GPU to process data has several limitations. For instance, a memory allocation in the GPU is a synchronizing event. That is, while the GPU is allocating memory, other GPU processes (e.g., kernel execution, registrations, etc.) are suspended until the memory is allocated. Another example is that GPUs typically limit the amount of memory transfers between host CPU and device GPU, e.g., one bidirectional transfer at a time. As a result, the transfer limit can stifle the rate that data is sent between host and device, hindering the ability of the behavioral recognition system to analyze data in a timely manner.

SUMMARY

One embodiment presented herein discloses a method. This method generally includes allocating, from a device memory, one or more variable-sized chunks of memory for a memory pool. An application allocates at least one of the chunks of memory from the memory pool for processing a plurality of input data streams in real-time. This method also generally includes receiving a request to allocate memory from the memory pool for input data. Upon determining that one of the chunks is available in the memory pool to store the input data, the chunk is allocated from the memory pool in response to the request.

Other embodiments include, without limitation, a non-transitory computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features, advantages, and objects of the present disclosure are attained and can be understood in detail, a more particular description of the disclosure, briefly summarized above, may be had by reference to the embodiments illustrated in the appended drawings.

It is to be noted, however, that the appended drawings illustrate only typical embodiments of the present disclosure and are therefore not to be considered limiting of its scope, for the present disclosure may admit to other equally effective embodiments.

DETAILED DESCRIPTION

Figure 1:
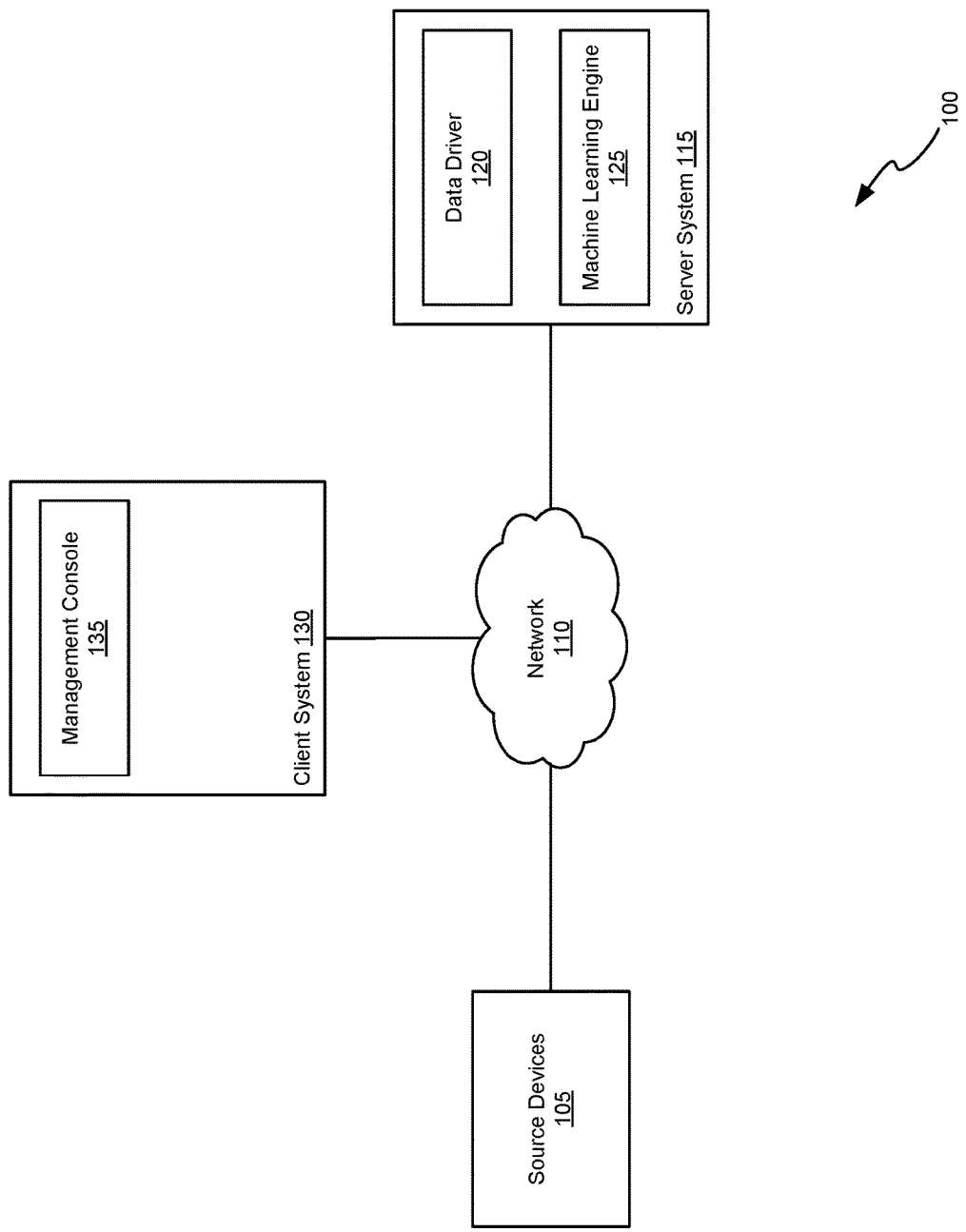
FIG. 1 illustrates an example computing environment, according to one embodiment.

Embodiments presented herein disclose techniques for managing memory in a computer system configured to process a large amount of data in real-time. For example, embodiments presented herein may be adapted to a behavioral recognition system that receives and analyzes real-time data (e.g., video data, audio data, SCADA data, and so on). A data driver (e.g., a video driver, an audio driver, a SCADA driver) in the behavioral recognition system may process data at various input sensors in a succession of phases, where the output of the final phase is used to analyze the data, e.g., learning a pattern of behavior that is normal, such that the system can later identify anomalous behavior observed in subsequently observed real-time data.

In one embodiment, to achieve optimal performance, the data driver is configured as part of a high data rate (HDR) framework that uses parallel computing capabilities of a graphics processing unit (GPU). The HDR framework may organize phases for each input sensor into a processing pipeline. The CPU and GPU may process a copy of data in memory in each pipeline in parallel while transferring data between one another.

The GPU may be subject to several memory management limitations that affect performance of a system. For example, device memory allocation is typically a synchronizing event.

Consequently, other processes occurring in the GPU are suspended until the GPU has completed allocating memory. As another example, the GPU, due to hardware restrictions, may be allowed a limited amount of memory transfers at a time, e.g., one transfer from host-to-device (and vice versa) at a time.

In one embodiment, to address such limitations, the data driver is configured to dynamically manage memory that is allocated in the host CPU and GPU device. In particular, the data driver maintains memory pools in the behavioral recognition system in host-side memory and device-side memory. The host-side memory pool may comprise pinned memory, and the device-side memory may comprise memory in the GPU. In one embodiment, a memory management component in the data driver allocates memory for use in memory pools of the CPU and the GPU. In particular, the data driver may allocate chunks of different sizes. Doing so allows the behavioral recognition system to accommodate various data (e.g., video files of different resolutions) at a time. Other components in the data driver may check out blocks of memory from the memory pools as needed. And when the memory is no longer needed, the components may check the blocks back in to the memory pool. Further, the data driver may release unused memory chunks from a given memory pool based on a decay time constant measure. When released from the memory pool, the memory chunks become available for future allocation (e.g., for allocation back to the memory pool as needed, or for allocation by processes other than the data driver).

Using memory pools to provide dynamic memory allocation by the data driver improves performance of the behavioral recognition system in light of memory constraints of a GPU device, which typically has significantly less memory than a CPU (e.g., a CPU may have 128 GB memory, whereas a GPU may have 6 GB of memory). In one embodiment, to avoid excess dormant memory blocks allocated in the memory pool (and thus avoid choking due to unused allocated memory), the data driver may allocate memory in multiples of N rows and N columns (e.g., if N=128, the data driver may allocate a 384×256 chunk of memory to for a video feed frame having a 352×240 resolution).

In addition, to reduce the amount of necessary memory transfers in each processing pipeline, the data driver may composite data from multiple input sensors before memory containing the data is transferred between host and device. To do so, the data driver may perform a bin-packing algorithm for incoming data from a number of input sensors. Using a data driver that processes video surveillance feeds as an example, data driver may pack a number of video feeds of varying resolutions and frame rates to prepare a reasonably-sized composite based on individual frame-rates, packing largest video feeds first and as closely as possible to efficiently use a memory chunk.

Once the composite data (e.g., a composite of video frames received at a given instance) is generated, the data driver may initiate transfer from host to device. Both the host and device may then process the data at each stage in parallel. For example, the data driver may process host-side data per feed, whereas the data driver processes device-side data per feed within the composite itself. And because the host and device are working on the same copy of the composite, the number of overall transfers between the host and device are reduced within the pipeline, thus increasing performance.

Note, the following uses a behavioral recognition system that adaptively learns patterns of activity from various types of data (e.g., video data, raw image data, audio data, SCADA data, information security data, etc.) as an example of a system that receives and analyzes relatively large amounts of data in real-time. However, one of skill in the art will recognize that embodiments disclosed herein are adaptable to a variety of systems configured with a GPU that is enabled to allow applications to use its parallel computing capabilities for processing large amounts of data in real-time (or within a short time frame). For example, embodiments may also be adapted towards big data systems that execute Extract, Transform, and Load (ETL) workflows.

FIG. 1 illustrates a computing environment 100, according to one embodiment. As shown, computing environment 100 includes source devices 105, a network 110, a server system 115, and a client system 130. The network 110 may transmit streams of data (e.g., video frames) captured by one or more source devices 105 (e.g., video cameras installed at various locations of a facility, etc.). Of course, the source devices 105 may be connected to the server system 115 directly (e.g., via USB or other form of connecting cable). Network 110 the data streams from the source devices 105 in real-time. In addition to a live feed provided by the source device 105, the server system 115 could also receive a stream of video frames from other input sources (e.g., VCR, DVR, DVD, computer, web-cam device, and the like). Video frames from a given source device 105 could have a different resolution compared to video frames from another source device 105.

For example, the source devices 105 may be video cameras situated at various locations in a building or facility. For example, source devices 105 may be situated in a parking garage to capture video streams at those locations. Each camera may provide streaming feed (i.e., a continuous sequence of images, or frames) analyzed independently by the server system 115. The source devices 105 may be configured to capture the video data as frames at a specified frame-rate. Further, the video data may be encoded using known formats, e.g., JPEG, PNG, GIF, and the like.

In one embodiment, the server system 115 includes a data driver 120 and a machine learning engine 125. In one embodiment, the server system 115 represents a behavioral recognition system. As further described below, data driver 120 processes the streams of data sent from the source devices 105 through a single- or multi-feed pipeline. In one embodiment, the server system 115 provides a high data rate (HDR) framework that allows, e.g., a developer, to adapt the data driver 120 to process various types of data, such as video data, audio data, image data, SCADA data, and the like, in real-time.

The data driver 120 may process incoming data from the source devices 105 using a pipeline that includes a number of phases. During each phase, the data driver 120 may perform a given task and use the resulting data as input for a successive phase. For example, assume that the data driver 120 processes video data from source devices 105. One phase within the pipeline may include analyzing a scene for foreground and background data. Another phase may include detecting foreground objects. And another phase may include tracking the objects within the scene. The data driver 120 outputs processed data to the machine learning engine 125.

In one embodiment, the machine learning engine 125 evaluates, observes, learns, and remembers details regarding events (and types of events) occurring within the data streams. When observations deviate from learned behavior (based on some learning model), the machine learning engine 125 may generate an alert (e.g., to a management console 135 executing on the client system 130). In one embodiment, the machine learning engine 125 performs neural-network-based linguistic analysis of the resulting data generated by the data driver 120.

The machine learning engine 125 generates a learning model by organizing the processed data into clusters. Further, the neuro-linguistic module may assign a symbol, e.g., letters, to each cluster which reaches some measure of statistical significance. From the letters, the neuro-linguistic module builds a dictionary of observed combinations of symbols, i.e., words based on a statistical distribution of symbols identified in the input data. Specifically, the neuro-linguistic module may identify patterns of symbols in the input data at different frequencies of occurrence, up to a maximum word size (e.g., 5 letters).

The most frequently observed words (e.g., 20) provide a dictionary of words corresponding to the stream of data. Using words from the dictionary, the neuro-linguistic module generates phrases based on probabilistic relationships of each word occurring in sequence relative to other words, up to a maximum phrase length. For example, the neuro-linguistic module may identify a relationship between a given three-letter word that frequently appears in sequence with a given four-letter word, and so on. The syntax allows the machine learning engine 125 to learn, identify, and recognize patterns of behavior without the aid or guidance of predefined activities.

Thus, unlike a rules-based system, which relies on pre-defined patterns to identify or search for in a data stream, the machine learning engine 125 learns patterns by generalizing input and building memories of what is observed. Over time, the machine learning engine 125 uses these memories to distinguish between normal and anomalous behavior reflected in observed data.

Figure 2:
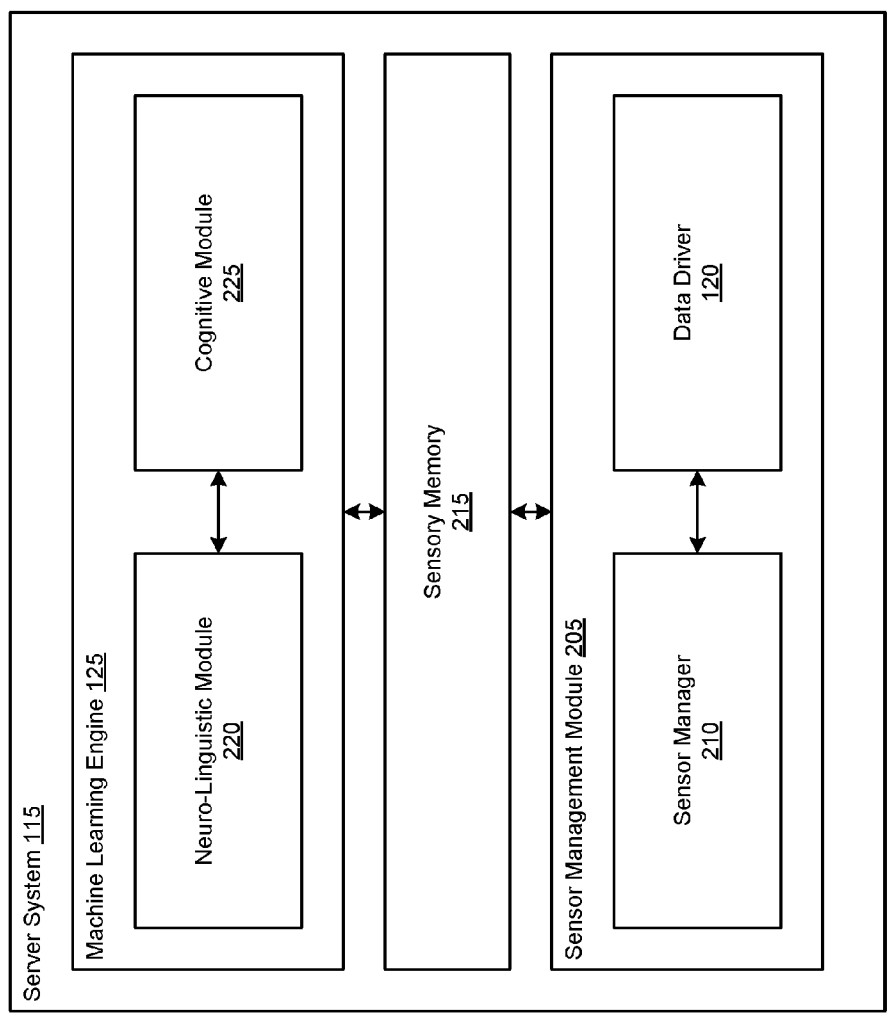
FIG. 2 further illustrates components of the server computing system shown in FIG. 1, according to one embodiment.

FIG. 2 further illustrates the server system 115, according to one embodiment. As shown, the server system 115 further includes a sensor management module 205 and a sensory memory 215. In addition, the machine learning engine 125 further includes a neuro-linguistic module 220 and a cognitive module 225. And the sensor management module 205 further includes a sensor manager 210 and the data driver 120.

In one embodiment, the sensor manager 210 enables or disables source devices 105 to be monitored by the data driver 120 (e.g., in response to a request sent by the management console 135). For example, if the management console 135 requests the server system 115 to monitor activity at a given location, the sensor manager 210 determines the source device 105 configured at that location and enables that source device 105.

In one embodiment, the sensory memory 215 is a data store that transfers large volumes of data from the data driver 120 to the machine learning engine 125. The sensory memory 215 stores the data as records. Each record may include an identifier, a timestamp, and a data payload. Further, the sensory memory 215 aggregates incoming data in a time-sorted fashion. Storing incoming data from the data driver 120 in a single location allows the machine learning engine 125 to process the data efficiently. Further, the server system 115 may reference data stored in the sensory memory 215 in generating alerts for anomalous activity. In one embodiment, the sensory memory 215 may be implemented in via a virtual memory file system. In another embodiment, the sensory memory 215 is implemented using a key-value pair.

In one embodiment, the neuro-linguistic module 220 performs neural network-based linguistic analysis of normalized input data to describe activity observed in the data. As stated, rather than describing the activity based on pre-defined objects and actions, the neuro-linguistic module 220 develops a custom language based on symbols, e.g., letters, generated from the input data. The cognitive module 225 learns patterns based on observations and performs learning analysis on linguistic content developed by the neuro-linguistic module 220.

Figure 3:
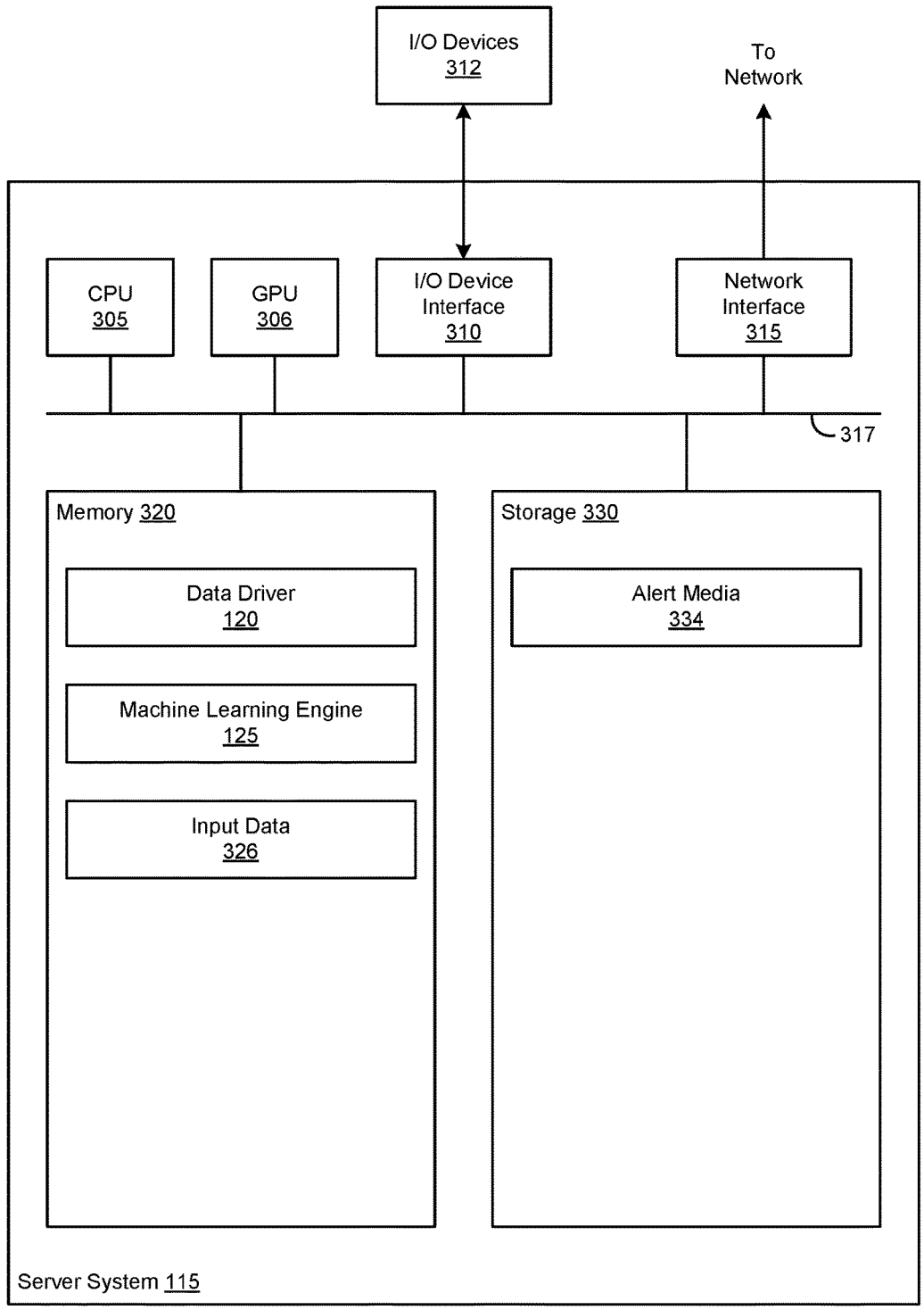
FIG. 3 illustrates an example server computing system configured to process a large amount of data in real-time, according to one embodiment.

FIG. 3 further illustrates the server system 115, according to one embodiment. As shown, the server system 115 includes, without limitation, a central processing unit (CPU) 305, a graphics processing unit (GPU) 306, a network interface 315, a memory 320, and storage 330, each connected to an interconnect bus 317. The server system 115 may also include an I/O device interface 310 connecting I/O devices 312 (e.g., keyboard, display and mouse devices) to the server system 115. Further, in context of this disclosure, the computing elements shown in server system 115 may correspond to a physical computing system. In one embodiment, the server system 115 is representative of a behavioral recognition system.

The CPU 305 retrieves and executes programming instructions stored in memory 320 as well as stores and retrieves application data residing in the memory 330. The interconnect bus 317 is used to transmit programming instructions and application data between the CPU 305, I/O devices interface 310, storage 330, network interface 315, and memory 320.

Note, CPU 305 is included to be representative of a single CPU, multiple CPUs, a single CPU having multiple processing cores, and the like. And the memory 320 is generally included to be representative of a random access memory. The storage 330 may be a disk drive storage device. Although shown as a single unit, the storage 330 may be a combination of fixed and/or removable storage devices, such as fixed disc drives, removable memory cards, optical storage, network attached storage (NAS), or a storage area-network (SAN).

In one embodiment, the GPU 306 is a specialized integrated circuit designed to accelerate graphics in a frame buffer intended for output to a display. GPUs are very efficient at manipulating computer graphics and are generally more effective than general-purpose CPUs for algorithms where processing of large blocks of data is done in parallel. As further described below, the data driver 120 (and the machine learning engine 125) uses the parallel processing capabilities of the GPU 306 to improve performance in handling large amounts of incoming data (e.g., video data from numerous source devices 105) during each pipeline processing phase.

In one embodiment, the memory 320 includes the data driver 120, the machine learning engine 125, and an input image 326. And the storage 330 includes alert media 334. As discussed above, the data driver 120 processes input data 326 sent from source devices 105 for analysis by the machine learning engine 125. The data driver 120 is customizable via a high data rate (HDR) framework that allows a developer to configure the data driver 120 to process a specified type of input data 326 (e.g., video data, image data, information security data, or any type of data that arrives to the data driver 120 in large amounts and needs to be processed in real-time). The machine learning engine 125 performs neuro-linguistic analysis on values that are output by the data driver 120 and learns patterns from the values. The machine learning engine 125 distinguishes between normal and abnormal patterns of activity and generates alerts (e.g., alert media 334) based on observed abnormal activity.

As stated, the data driver 120 may use the parallel computing capabilities provided by the GPU 306 to increase performance of processing input data 326. In particular, a memory management component in the data driver 120 may dynamically allocate variable-sized chunks of memory into host-side and device-side memory pools. Doing so allows the data driver 120 to readily allocate memory for incoming data from the already-allocated memory pool. That is, because device memory allocation in the GPU 306 is a synchronizing event (which blocks other GPU processes from being performed while the allocation occurs), the data driver 120 allocates the data to the memory pools to avoid allocation synchronization events during processing phases.

Further, the memory management component may allocate additional memory chunks into a given memory pool, as needed. Further still, to prevent an excessive amount of dormant memory allocated to the memory pool (that is therefore unable to be allocated towards other processes in the server system 115), the memory management component may release unused memory chunks from the memory pool by applying a time decay constant towards unused memory chunks in the memory pool. In addition, the memory management component may be configured to restrict a specified percentage of total memory (of host-side memory or of device-side memory) that can be allocated to a memory pool at a given time.

Further, the data driver 120 may package blocks of input data 326 into a composite copy that can be transferred to the device-side for processing by the GPU 306. Doing so allows the data driver 120 to use both thread processes in the CPU 305 and kernel processes in the GPU 306 to handle the input data 326 during pipeline phases. Using video feed data as an example, the data driver 120 may package multiple video frames from different sources and of different resolutions into as one memory block, e.g., using a bin-packing algorithm. The data driver 120 may allocate memory for the data from the memory pools.

Figure 4:
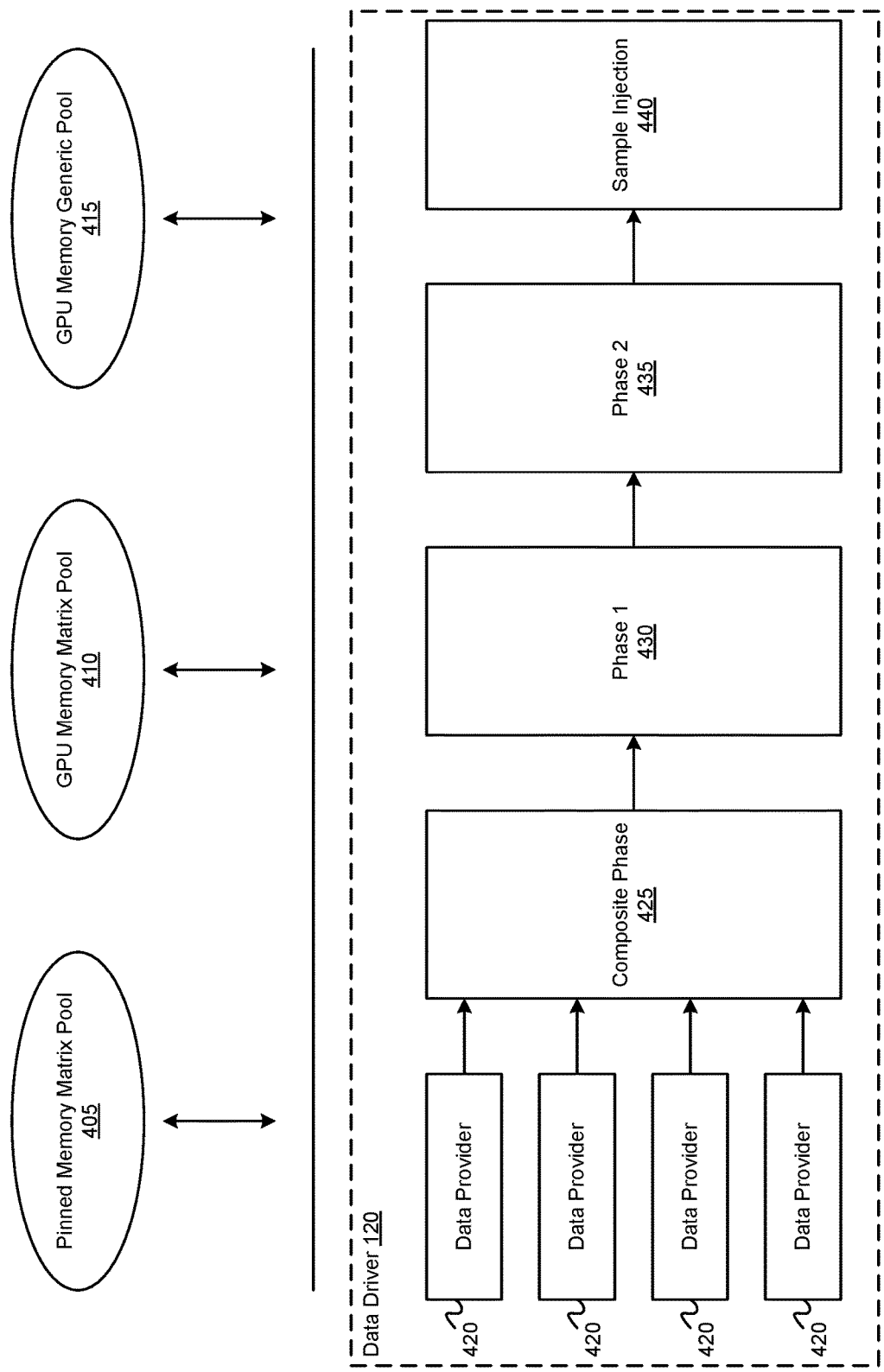
FIG. 4 illustrates an example data processing pipeline, according to one embodiment.

FIG. 4 illustrates an example data processing pipeline of the data driver 120 relative to memory pools in the server system 115, according to one embodiment. As shown, the pipeline includes multiple data providers 420, a composite phase 425, a phase 1 430, a phase 2 435, and a sample injection phase 440. Of course, the pipeline may include additional intermediary phases. Further, the server system 115 includes a pinned memory matrix pool 405 (allocated from CPU memory). The server system 115 further includes a GPU memory matrix pool 410 and a GPU memory generic pool 415 (allocated from GPU memory). Note that in practice, there are multiple pipelines based on host and device memory, number of data streams, and total number of source devices 105.

The pinned memory matrix pool 405 represents chunks of memory allocated from pinned memory managed by the CPU 305. As known, pinned memory remains in-place within the CPU RAM to facilitate data transfer to the memory of the GPU 306. The GPU memory matrix pool 410 includes memory chunks allocated in the GPU 306 memory that may be multi-dimensional matrices. The GPU memory generic pool 415 includes memory chunks that are organized as memory blocks or arrays.

Illustratively, the data driver 120 may check out memory from each of the pools 405, 410, and 415. In one embodiment, a data provider 420 connects with an assigned source device 105 and receives input data from the source device 105. The data provider 420 feeds the input data to the composite phase 425. In the video feed example, the composite phase 425 may receive multiple frames originating from the various source devices 105. In composite phase 425, the data driver 120 packages the multiple frames into a chunk of memory. At this phase 425, the data driver 120 may check out memory from one of the GPU memory pools 410 and 415 for the packaged data and transfer a copy of the packaged data to the GPU 306. That is, rather than transfer data from a given data provider 420 individually (and thus creating a performance bottleneck due to hardware limitations for transfers), the data driver 120 sends a composite of data received from the multiple data providers 420. Advantageously, doing so reduces the amount of data transfers needed between host and device.

In one embodiment, the data driver 120 analyzes the host-side data separately per data provider 420. Using video data as an example, the data driver 120 analyzes host-side video streams on a per-feed basis, e.g., in the phase 1 430, phase 2 435, and/or the sample injection phase 440. Further, the data driver 120 may analyze device-side video streams per-feed but within the packaged data. As stated, in each phase, data is processed and then passed from one phase to another. The resulting data may be sampled into values (e.g., from 0 to 1, inclusive) and output to the machine learning engine 125 (via the sample injection phase 440).

Figure 5:
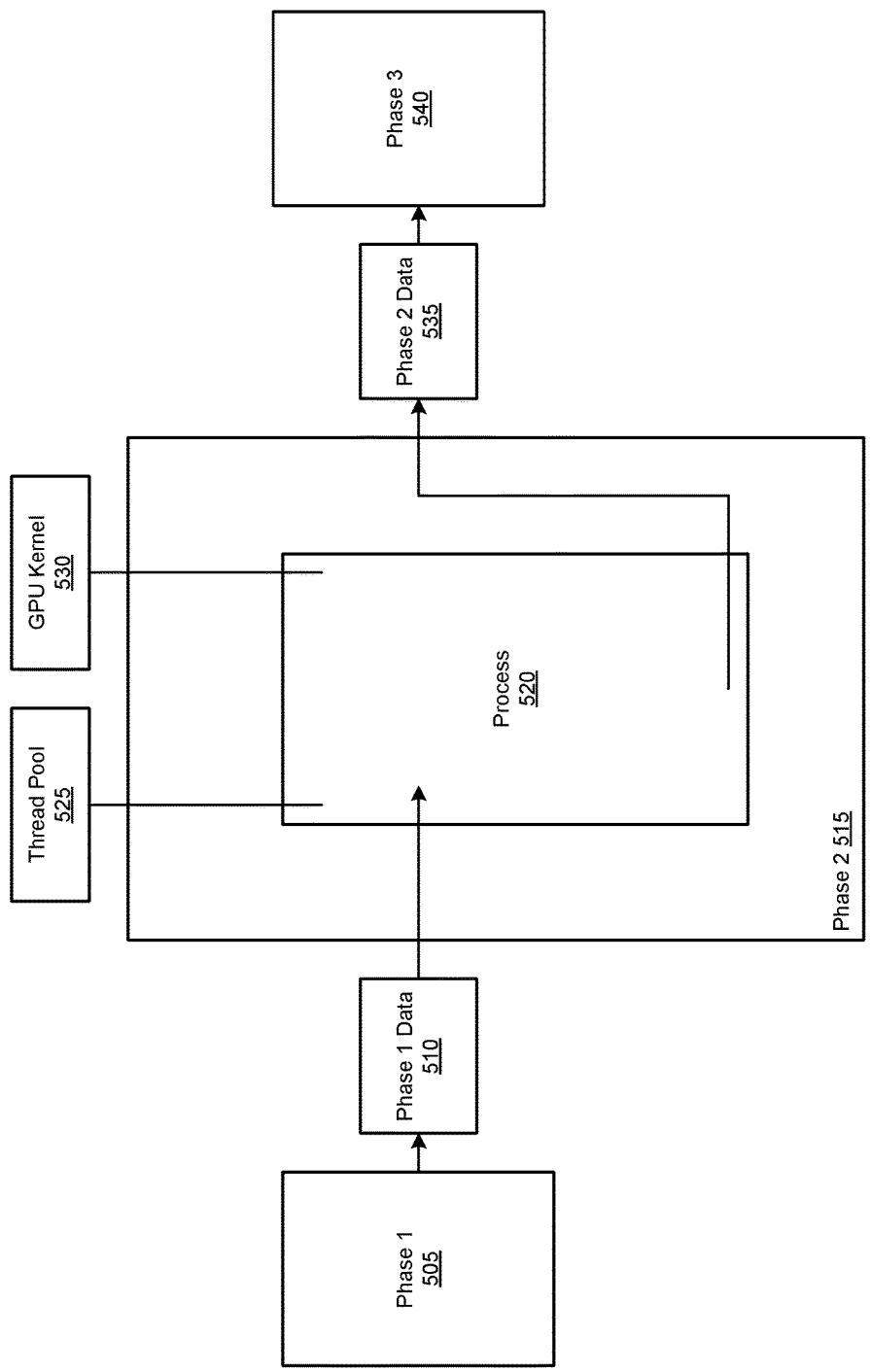
FIG. 5 illustrates an example of processing phase data, according to one embodiment.

FIG. 5 illustrates an example processing phase flow, according to one embodiment. In particular, FIG. 5 depicts a phase 2 515 that has received processed phase data 510 from a phase 1 505.

As an example, the phase 1 505 may correspond to a detector process that distinguishes foreground objects from background objects in a video feed, and the phase data 510 may correspond to detected foreground and background objects. The phase 1 505 can output the resulting phase data 510 to the phase 2 515. Phase 2 515 can include a process 520 that tracks each detected object within a series of video frames. The process 520 may execute as a thread in a thread pool 525 (host-side) or within a process of a GPU kernel 530 (device-side) based on whether the phase 2 515 is processing the feed within CPU memory or within GPU memory. The process 525 can output phase 2 data 535 to a phase 3 540 for further processing.

Figure 6:
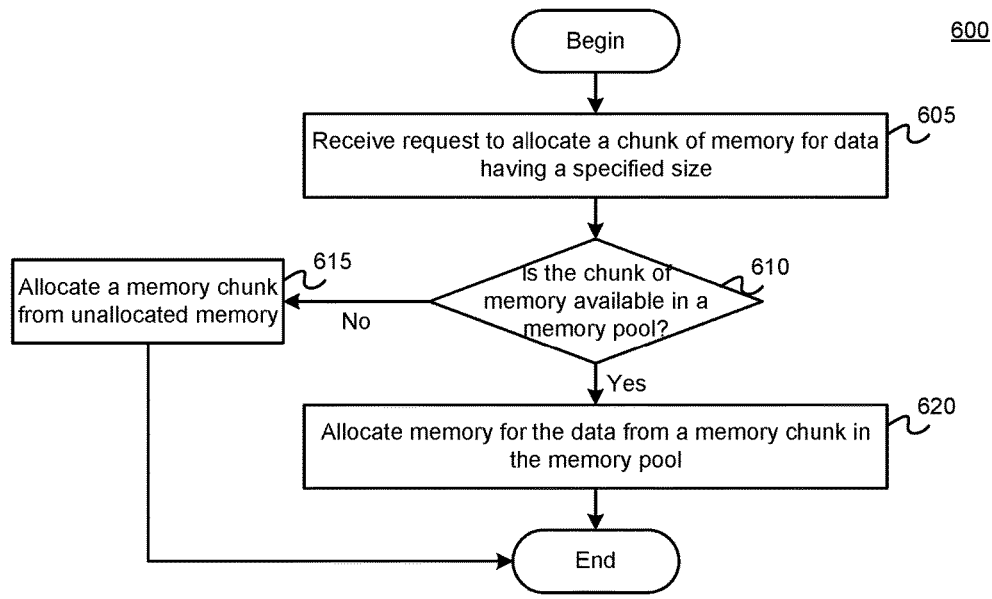
FIG. 6 illustrates a method for dynamically allocating memory via CPU-side and GPU-side memory pools, according to one embodiment.

FIG. 6 illustrates a method 600 for dynamically allocating memory via host-side and device-side memory pools, according to one embodiment. In this example, assume that the data driver 120 previously allocated memory chunks in each of the memory pools of the CPU and the GPU. The maximum amount of memory allocated in a given memory pool may be subject to a specified configuration, e.g., x % of total memory in the CPU (or GPU).

As shown, method 600 begins at step 605, where a memory management component in the data driver 120 receives a request to allocate a chunk of memory for data having a specified size. For example, the memory management component may receive the request from the composite phase process to allocate pinned memory from the memory pool that is large enough to store the composite data.

At step 610, the memory management component determines whether a chunk of memory that is large enough to contain the data is available in the memory pool. As stated, the chunks in a given memory pool may be allocated in multiples of N rows and N columns, e.g., N=128. To avoid excess dormant memory blocks, the memory management component may select a chunk that is slightly larger than the data in the request. Using video feed data as an example, the phase may request memory from the pinned matrix memory pool for a SIF (source input format) frame of 352×240 resolution. Assuming that N=128, the memory management component may determine whether a chunk of size 384×256 is available in the pinned memory pool.

If not, then at step 615, the memory management component allocates a memory chunk from available (i.e., not currently allocated) memory in the CPU RAM or the GPU, based on the request. Otherwise, at step 620, the memory management component checks out and uses the memory chunk from the memory pool. In the event that the request is specified to the GPU, allocating memory from the memory pool avoids allocating available memory in the GPU, thus avoiding a synchronizing event and allowing other processes in the GPU to continue executing.

The memory management component may continue to check memory chunks in and out of the memory pools as needed by the data driver 120. Further, in one embodiment, the memory management component may deallocate unused memory from the memory pools subject to a time decay constant. Doing so minimizes the amount of dormant memory allocated to a given memory pool. As known, dormant memory is generally undesirable because such memory remains allocated to the pool yet unused by the data driver 120 and, at the same time, unavailable to other processes executing in the server system 115.

Figure 7:
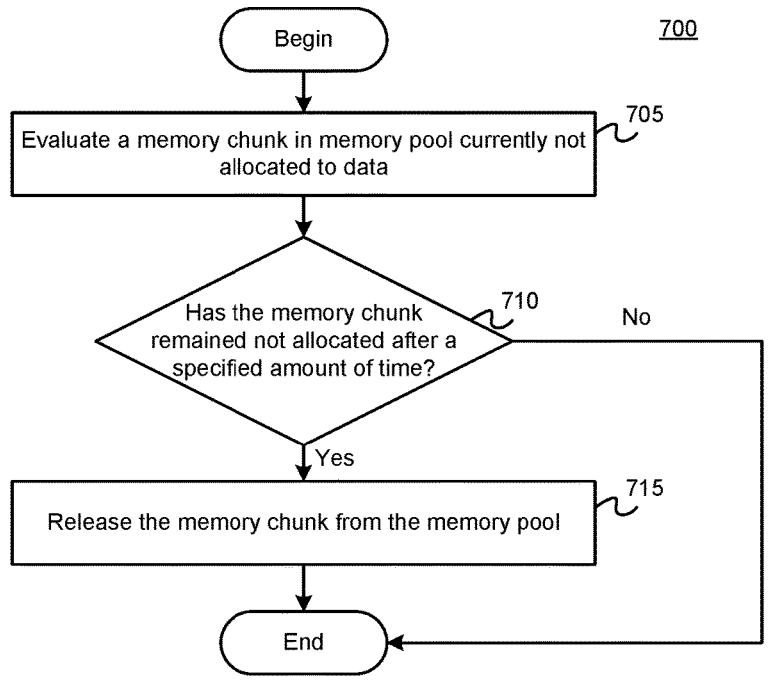
FIG. 7 illustrates a method for freeing (deallocating) memory in a memory pool, according to one embodiment.

FIG. 7 illustrates a method 700 for deallocating memory from a given memory pool, according to one embodiment. As shown, method 700 begins at step 705, where the memory management component evaluates a chunk of memory in the memory pool that is currently not allocated to data. To do so, the memory management component may evaluate timestamps associated with the memory chunk that indicate the instance that the memory chunk was most recently allocated to data.

At step 710, the memory allocation component determines whether the period that the memory chunk currently remains unallocated for a specified amount of time. For example, the memory management component may do so using a time decay constant relative to the amount of time that the memory chunk is unused. If not, then the method 700 ends. Otherwise, at step 715, the memory management component releases the unused memory chunk from the memory pool. The memory management component may reallocate the memory to the memory pool at a later point in time (e.g., as demand for more memory from the processing phases grows).

Figure 8:
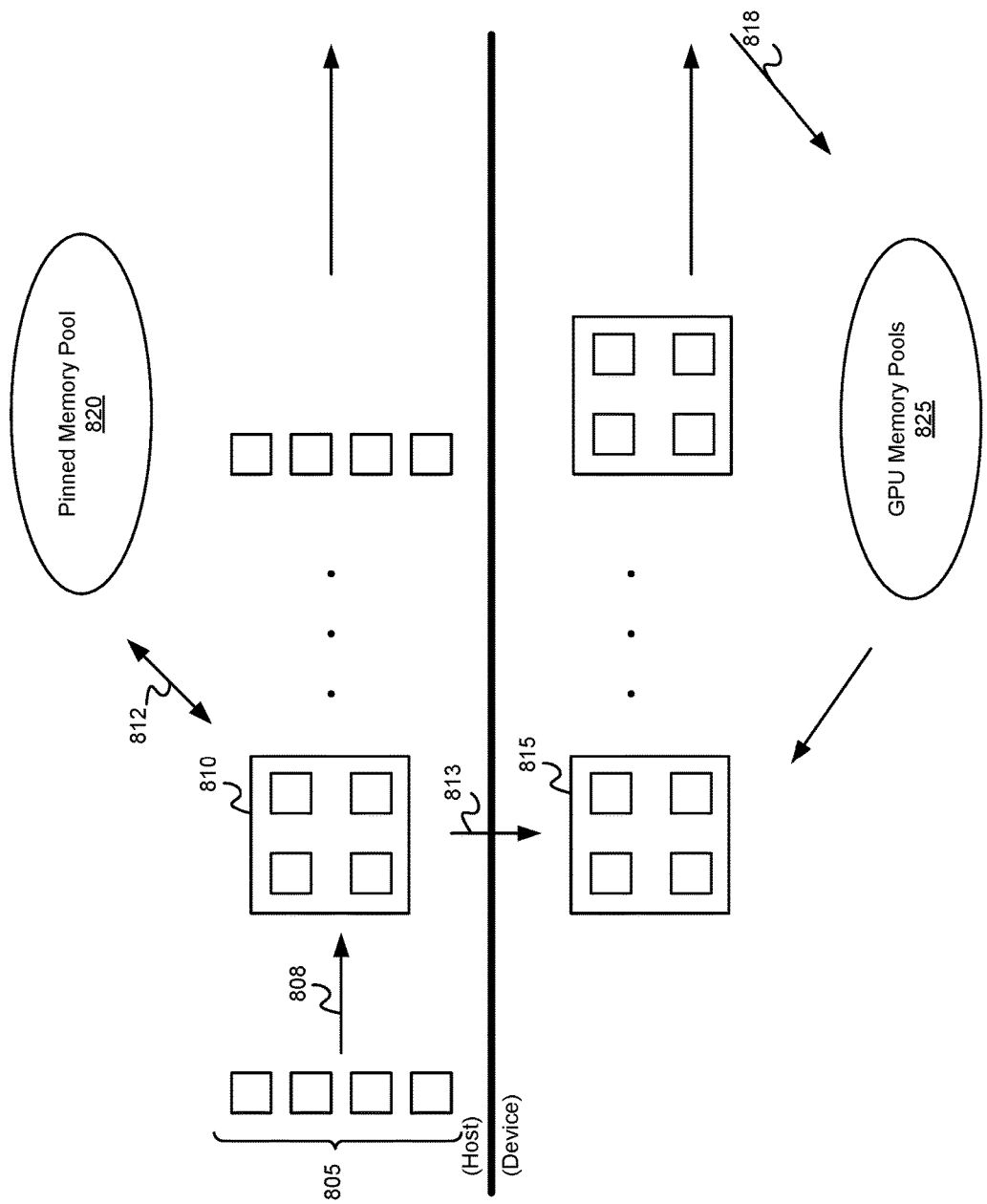
FIG. 8 illustrates an example of preparing a composite of multiple feeds of data for transfer between host and device, according to one embodiment.

The data driver 120 may allocate memory for data (e.g., video feeds and the like) being analyzed in various phases. For example, FIG. 8 illustrates a flow for preparing a composite of multiple feeds of data for transfer between host (above the bold line in FIG. 8) and device, according to one embodiment. As stated, the data driver 120 receives, at multiple data providers, a number of streams of data, such as video feeds. As an example, FIG. 8 depicts each video feed 805 as a block of data in the host-side (CPU) memory of the server system 115. Each of the video feeds 805 may be of various resolutions. For example, one video feed 805 could be at a 800×600 resolution, 1024×768 resolution, etc. In addition, each of the video feeds 805 may be of various frame rates.

To use the parallel processing capabilities of the GPU 306, the data driver 120 needs to transfer a copy of the feeds 805 to device-side memory. To do so and prevent numerous memory transfers for each of the feeds 805, at 808, the data driver 120 generates a composite 810 of the feeds 805. To allocate memory to store the composite 810, the data driver 120 may request the memory from a host-side pinned memory pool 820 (at 812). Once allocated, the data driver 120 can generate the composite 810 of the feeds 805, e.g., using a bin-packing algorithm where the largest feeds are packed before the smaller feeds.

In one embodiment, the data driver 120 initiates a transfer of a copy of the composite 810 to the device-side memory. The GPU 306 may allocate memory from one of the GPU memory pools 820. The data driver 120 then transfers the composite copy 815 to the device-side memory allocated from the GPU memory pool 820 (at 813). As a result, the data driver 120 may process the feeds 805 in parallel between the host-side and the device-side of the server system 115. Illustratively, the data driver 120 processes host-side data per feed, and processes device-side data per feed within the composite copy 815. After the processes are complete (and output to the sensory memory 215), the data driver 120 may check the allocated memory back to the pinned memory pool 820 and GPU memory pool 825.

Figure 9:
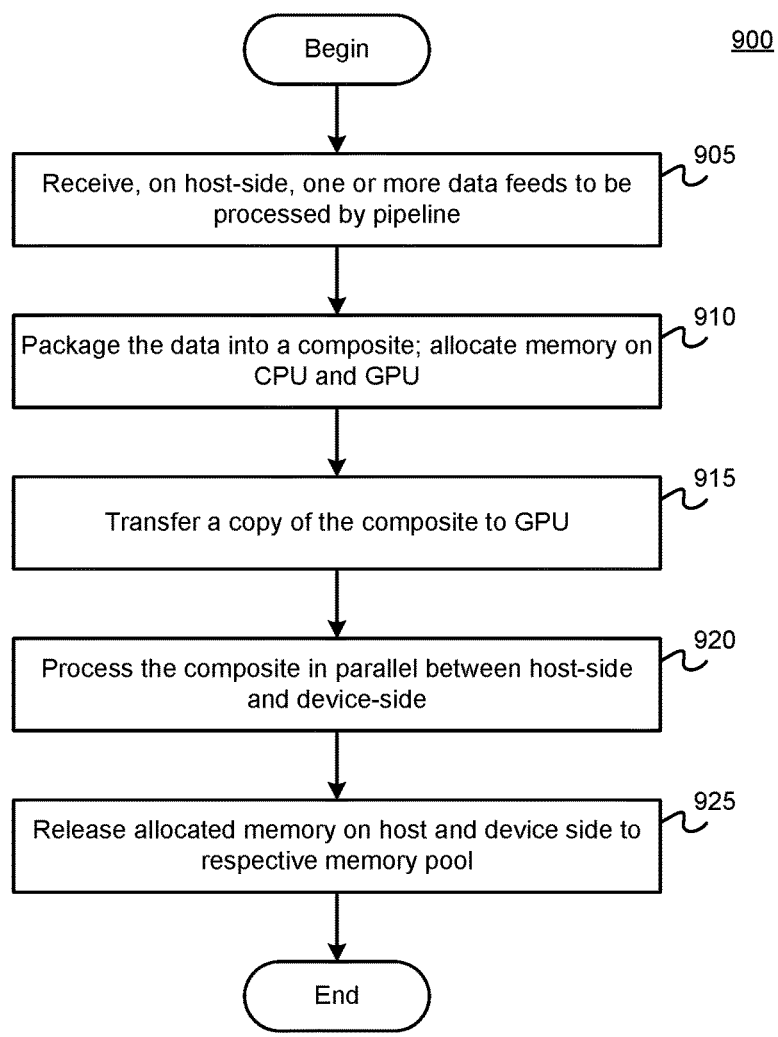
FIG. 9 illustrates a method for preparing a composite of multiple feeds of data for transfer between host and device, according to one embodiment.

FIG. 9 illustrates a method 900 for preparing a composite of multiple feeds of data for transfer between host and device, according to one embodiment. As shown, method 900 begins at step 905, where the data driver 120 receives, from the data providers 420, one or more data feeds (e.g., video feeds) to be processed. At step 910, the data driver 120 packages the data into a composite. To do so, the data driver 120 may perform a bin-packing algorithm to fit the data feeds into a chunk of memory allocated from a memory pool on host-side. Further, the data driver 120 allocates a memory chunk on host-side and device-side that can contain the composite.

At step 915, the data driver 120 transfers a copy of the composite data to the device-side. At step 920, the data driver 120 processes the composite data at host-side and device-side. As stated, at host-side, the data driver 120 may process the feeds separately, while at device-side, the data driver 120 processes the feeds within the composite. Once the feeds are processed, the data driver 120 may output the resulting sample data to the sensory memory 215. At step 925, the data driver 120 releases the memory chunks previously storing the composite data to the respective memory pools. The memory chunks may thereafter be checked out for incoming input data feeds as needed.

In the preceding, reference is made to embodiments of the present disclosure. However, the present disclosure is not limited to specific described embodiments. Instead, any combination of the following features and elements, whether related to different embodiments or not, is contemplated to implement and practice the techniques presented herein.

Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects presented herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures.

For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments presented herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments may be devised without departing from the basic scope thereof, and the scope thereof is determined by the claims that follow.

What is claimed is:

1. A computer-implemented method comprising:
    receiving, from at least one data provider, a plurality of video feeds, at least one video feed of the plurality of video feeds having at least one of a resolution and a frame rate that is different relative to other video feeds of the plurality of video feeds;
    allocating, from a device memory, at least one chunk of memory from one or more variable-sized chunks of available memory of a memory pool;
    packaging the plurality of video feeds as a composite of the plurality of video feeds into the at least one allocated chunk of memory of the memory pool; and
    transferring the packaged composite of the plurality of video feeds to a machine-learning engine, the machine-learning engine including a neuro-linguistic model configured to determine anomalous behavior in the plurality of video feeds.

2. The method of claim 1, wherein allocating at least one chunk of memory from one or more variable-sized chunks of available memory includes determining that at least one chunk of memory of the memory pool is not available.

3. The method of claim 1, further comprising:
    returning the at least one allocated chunk of memory to the memory pool after the packaged composite of the plurality of video feeds has been transferred.

4. The method of claim 1, wherein the at least one allocated chunk of memory is associated with a time decay constant.

5. The method of claim 4, further comprising:
    releasing the at least one allocated chunk of memory after the at least one allocated chunk is unused after a specified amount of time based on the time decay constant.

6. The method of claim 1, wherein a device associated with the device memory is a graphics processing unit (GPU).

7. The method of claim 1, wherein the at least one allocated chunk of memory is allocated based on a total device memory size.

8. A non-transitory computer-readable storage medium comprising: computer-executable instructions that, when executed on at least one processor, cause the at least one processor to:
    receive, from at least one data provider, a plurality of video feeds, at least one video feed of the plurality of video feeds having at least one of a resolution and a frame rate that is different relative to other video feeds of the plurality of video feeds;
    allocate, from a device memory, at least one chunk of memory from one or more variable-sized chunks of available memory of a memory pool;
    package the plurality of video feeds as a composite of the plurality of video feeds into the at least one allocated chunk of memory of the memory pool; and
    transfer the packaged composite of the plurality of video feeds to a machine-learning engine, the machine-learning engine including a neuro-linguistic model configured to determine anomalous behavior in the plurality of video feeds.

9. The non-transitory computer-readable storage medium of claim 8, wherein the computer-executable instructions to allocate the at least one chunk of memory include instructions to:
    determine that at least one chunk of memory of the memory pool is not available for allocation.

10. The non-transitory computer-readable storage medium of claim 8, wherein the computer-executable instructions further comprise instructions that cause the at least one processor to:
    return the at least one allocated chunk of memory to the memory pool.

11. The non-transitory computer-readable storage medium of claim 8, wherein the at least one chunk of allocated memory is associated with a time decay constant.

12. The non-transitory computer-readable storage medium of claim 11, wherein the computer-executable instructions further comprise instructions that cause the at least one processor to:
 release the at least one allocated chunk of memory if the at least one allocated chunk of memory is unused after a specified amount of time based on the time decay constant.

13. The non-transitory computer-readable storage medium of claim 8, wherein the device memory is associated with a graphics processing unit (GPU).

14. The non-transitory computer-readable storage medium of claim 8, wherein the at least one allocated chunk of memory is allocated based on a total device memory size.

15. A system, comprising:
 a processor; and
 a memory in communication with the processor and storing code, which, when executed on the processor, causes the processor to:
  receive a plurality of video feeds, at least one video feed of the plurality of video feeds having at least one of a resolution and a frame rate that is different relative to other video feeds of the plurality of video feeds,
  allocate at least one chunk of memory from one or more variable-sized chunks of available memory of a memory pool,
  package the plurality of video feeds as a composite of the plurality of video feeds into the at least one allocated chunk of memory, and
  transfer a copy of the packaged composite of the plurality of video feeds to a machine-learning engine including a neuro-linguistic model configured to determine anomalous behavior in the plurality of video feeds.

16. The system of claim 15, wherein the code to allocate the at least one chunk of memory includes code to:
 determine if at least one chunk of memory of the memory pool is not available for allocation.

17. The system of claim 15, wherein the code, when executed, further causes the processor to:
 return the at least one allocated chunk of memory to the memory pool.

18. The system of claim 15, wherein the at least one chunk of allocated memory is associated with a time decay constant.

19. The system of claim 18, wherein the code, when executed, further causes the processor to:
 release the at least one allocated chunk of memory if the at least one allocated chunk of memory is unused after a specified amount of time based on the time decay constant.

20. The system of claim 15, further comprising a graphics processing unit (GPU).

* * * * *